United States Patent [19]

Leslie et al.

[11] Patent Number: 4,869,847

[45] Date of Patent: Sep. 26, 1989

[54] MICRODISPERSE POLYMER/LIQUID CRYSTAL COMPOSITE

[75] Inventors: Thomas M. Leslie, Clinton Township; Garo Khanarian, Berkeley Heights, both of N.J.

[73] Assignee: Hoechst Celanese Corp., Somerville, N.J.

[21] Appl. No.: 26,404

[22] Filed: Mar. 16, 1987

[51] Int. Cl.$^4$ .......................... C09K 19/52; G02F 1/00
[52] U.S. Cl. ............................ 252/299.01; 252/299.7; 252/583
[58] Field of Search ............... 928/1; 252/583, 299.01, 252/299.7; 523/223

[56] References Cited

U.S. PATENT DOCUMENTS

| | | | |
|---|---|---|---|
| 3,872,050 | 3/1975 | Benton et al. | 528/44 X |
| 4,045,383 | 8/1977 | Koff | 252/299.7 X |
| 4,101,207 | 7/1978 | Taylor | 252/299.7 X |
| 4,501,503 | 2/1985 | Burley et al. | 252/299.7 X |
| 4,556,289 | 12/1985 | Fergason | 252/299.01 X |
| 4,671,618 | 6/1987 | Wu et al. | 350/347 V |
| 4,673,255 | 6/1987 | West et al. | 350/347 V |
| 4,685,771 | 8/1987 | West et al. | 350/347 V |
| 4,688,900 | 8/1987 | Doane et al. | 350/347 V |

*Primary Examiner*—Stephen J. Kalafut
*Attorney, Agent, or Firm*—Depaoli & O'Brien

[57] ABSTRACT

A novel composite of liquid crystal droplets having a diameter of no more than 0.1 micron dispersed in a synthetic resin matrix is disclosed. The novel material does not scatter light to any appreciable degree.

17 Claims, No Drawings

MICRODISPERSE POLYMER/LIQUID CRYSTAL COMPOSITE

This invention was made with Government support under Contract No. F336115-85-6- 5025 awarded by the Department of Defense (DOD). The Government has certain rights in this invention.

BACKGROUND OF THE INVENTION

1. Field of the Invention

The present invention relates generally to liquid crystal technology and more specifically to a new material which does not scatter visible light to any appreciable degree. The novel composites of this invention appear clear and not cloudy to visible wavelenghts and function as a Kerr material. The novel material consists essentially of liquid crystals dispersed in a synthetic resin matrix wherein the droplet size of the liquid crystal is so small that it is substantially incapable of scattering visible light. Preferred are those materials wherein no more than about 15% of the droplets are greater than 0.1 micron in diameter. Particularly preferred are droplet sizes of 0.05±0.02 microns.

2. Background Art

Synthetic resins containing liquid crystals are known in the art and have been the subject of various patents and publications. The most relevant prior art is World Patent No. 85/04262 of Doane et al, which was published on Sept. 25, 1985, the disclosure of which is incorporated by reference. Said published application discloses light modulating material comprising a liquid crystal dispersion in a synthetic resin matrix and the materials, resins and techniques utilized in said disclosure are equally applicable to the instant invention with one major and fundamental difference.

The entire purpose of the Doane et al disclosure is to produce materials which have the ability to scatter visible light, and their primary applications are envisioned as display materials. The instant invention is concerned with materials which do not scatter visible light. Thus, the material of the instant invention is diametrically opposed to the material of said published application. The major difference between the material of the instant invention and the material of the published application resides in the size of the microdroplets which are dispersed in the synthetic resin matrix. As has heretofore been stated, at least 85% of the droplets of the materials of the instant invention have a diameter no greater than 0.1 micron whereas the materials of the published application are stated to have droplet sizes greater than 0.2 micron.

Another pertinent publication is an article entitled "Field Controlled Light Scattering from Nematic Microdroplets" by Doane et al, published in *Applied Physics Letters*, Vol. 48, No. 4, Jan. 27, 1986, pp. 269-271. This publication is directed towards materials which scatter light and, at page 270, a graph appears which lists certain theoretical curves as to the droplet sizes of liquid crystals dispersed in a synthetic resin matrix. As can be seen, a theoretical droplet size as low as 0.150 micron is listed even though the experimental results show that it was not obtained.

DISCLOSURE OF THE INSTANT INVENTION

In accordance with the present invention, droplets of liquid crystals are dispersed in a synthetic resin matrix, preferably an epoxy, to provide a material which does not scatter visible light to any appreciable amount but acts as a Kerr material instead.

The Kerr effect is the birefringence induced in a medium by an external electrical field and is described in the literature, including a book entitled *Nonlinear Optical Properties of Organic and Polymeric Materials*, edited by David J. Williams (ASC Symposium Series 233), published by the American Chemical Society, Washington, D.C., 1983, pp. 236-238, the disclosure of which is incorporated by reference.

The novel materials of the instant invention are prepared in a manner very similar to that set forth in published application No. 85/04262, namely by the addition of a liquid crystal material which is soluble in a prepolymer or monomer but not soluble in the finished polymer and thereafter either curing the same, if it is a thermosetting resin, or polymerizing the same, if it is a thermoplastic resin, in order to force the liquid crystal out of solution and to form droplets which are insoluble in the polymeric matrix. The difference between the instant process and the process of the published application is that the curing and/or polymerization is carried out at such a rapid rate that the droplets do not have time to "meet or coalesce" and form larger droplet sizes but are trapped within the polymeric matrix at such a rapid rate that they do not have chance to grow to a size greater than about 0.1 micron in diameter. As can well be appreciated, it is difficult to assign exact curing procedures for every single resin since they will obviously vary depending on the particular resin and the particular curing or polymerization procedure which is used. However, rapid polymerization is known in the art and specific procedures will be later illustrated in the Examples. It should be immediately understood that it is possible to use the identical same polymeric material, the identical curing agent (in the case of a thermosetting resin) and the identical liquid crystal material and to cure the same by ultraviolet radiation and obtain droplet sizes which vary such that they fall within the scope of the instant invention and outside the scope of the instant invention. Thus, by way of example, if a mixture of an epoxy resin and a liquid crystal is subject to ultraviolet radiation of low intensity, it takes longer for the material to cure and, therefore, the resulting droplets have time to "meet or coalesce" and will have too large a diameter to be useful in the instant invention. On the other hand, if a high intensity ultraviolet source is used, the material will cure rapidly such that the liquid crystal droplets which are formed do not have time to "meet" and will be of a sufficiently small diameter to produce the novel composite material of this invention.

The liquid crystal materials which are employed in the novel material of this invention are well known in the art and include smetic, nematic, cholesteric or cholesteric-nematic liquid crystals. However, optimum results have been obtained with the nematic cyanobiphenol liquid crystals and they are preferred.

Materials of this type are well known in the art and are described in numerous publications including U.S. Pat. No. 4,544,583, cols. 8 and 9, the disclosure of said U.S. patent being incorporated by reference.

Another distinction between the novel material of the instant invention and the prior art is that it is not necessary that the index of refraction of the polymer should match or be similar to that of the liquid crystal. As a point of fact, optimum results are obtained when the index of refraction of the liquid crystal is different from the index of refraction of the polymer and wherein the index of refraction of the polymer is as low as possible.

The amount of liquid crystal which is used in order to prepare the novel materials of this invention is not narrowly critical but it should range from about 25 to about 40% by weight based on liquid crystal plus polymer with 30–35 wt. % being preferred.

It should also be immediately apparent that in order to effect a rapid cure and/or polymerization that relatively thin films are necessary since otherwise curing and/or polymerization cannot take place at a rapid enough rate to ensure that the droplet size of the microspheres is within the desired range. The films having a thickness of between 1 micron for wave guided devices and 36 microns for "slab or bulk" type devices are particularly preferred.

Any transparent or substantially transparent polymeric material in which the liquid crystal is soluble in either a prepolymer thereof or in a monomer thereof can be employed providing liquid crystal material does not adversely affect the same. Suitable polymers include polyvinyl pyrrolidone, polyethylene oxide, copolymers of ethylene and maleic anhydride, copolymers of vinyl methyl ether and maleic anhydride, ethyl cellulose, polyvinyl alcohol, polyvinylidene chloride, polyvinyl chloride, copolymers of vinyl alcohol and vinyl chloride, polyolefin films such as polyethylene and polypropylene, polyethylene terephthalate, polyvinylidene chloride, polyurethane, polyethylene glycol terephthalate, acrylic resins such as polyalkyl-acrylates and methacrylates such as polymethacrylate, polyethylacrylate, polymethylmethacrylate, polybutylmethacrylate, polystyrene, polycarbonates, silicone resins, polyalkylsiloxanes such as polymethylsiloxane, alkyl resins, as well as the preferred epoxy resins.

Curing and/or polymerization can be accomplished chemically or by exposure to high intensity radiation such as ultraviolet.

A very convenient method for the preparation of the novel materials of this invention involves dissolving a liquid crystal in a monomer (in the case of a thermoplastic resin) or in a prepolymer (in the case of a thermosetting resin), i.e., placing the material between two glass plates and subjecting the same to curing and/or polymerization. In the case of a thermosetting resin, the above can be conveniently done by utilizing an epoxy resin together with a liquid crystal, preferably one comprising a cyanobiphenyl, such as a commercial product identified as E-7 from EM Chemical Corporation and subjecting the same to high-intensity ultraviolet radiation, e.g., 300 watts, for a total period of time of about 0.5 to 5.0 min. depending on the photo initiator.

As has heretofore been stated, the novel materials of this invention appear substantially clear and not cloudy to visible wavelengths and act as a Kerr material. Thus, when a voltage is applied across a thin composite of this invention, sandwiched between constructing glass, a birefringence is induced. This is a quadratic effect and for certain of the materials of this invention, the Kerr constant is about 4,000 times the Kerr constant of liquid $CS_2$ ($1 \times 10^{-3}$ esu). Higher values can be obtained by using liquid crystals with higher dielectric anisotropy. Thus, when an electric field is applied to the materials of this invention, a change in refractive index occurs which can be in the order of $10^{-3}$. As can well be appreciated by those skilled in the art, such Kerr materials have many devices that operate on a change of refractive index. Such devices include electro-optic modulator (bulk or waveguide), beam steering where the degree of refraction is voltage controlled, reflection devices where the degree and angle of refraction depend on voltage controlled refractive index, etalon devices wherein the optical medium inside is controlled by a voltage, bistable switches based on electric-optic etalons.

The liquid crystal material of this invention can also be designed to have a large first hyperpolarizability $\beta$ and so upon application of a D.C. electric field a large $X^{(2)}$ is produced. This can be used in nonlinear optical devices such as second harmonic generators. If a periodic electrode structure is designed where the periodicity is equal to a coherence length of material, then phase matched second harmonic generation can be produced in bulk or in a waveguide.

The following examples will illustrate the best mode now contemplated for carrying out the invention.

In the examples which follow, the following four mixtures were utilized.

Mixture 1

5 grams of E-7 which is a nematic liquid crystal mixture obtainable commercially from EM Industries, Inc., Hawthorne, N.Y., and consisting of 15 wt. % 4-cyano-4'-n-pentylbiphenyl, 21 wt. % 4-cyano-4'-n-heptylbiphenyl, 16 wt. % 4-cyano-4'-octyloxybiphenyl and 12% 4-cyano-4'-pentylterphenyl and 10 grams of an epoxy resin purchased from Norland Products, Inc., of New Brunswick, N.J., as commercially available Norland Optical Adhesive 60 are weighed in a brown bottle and capped. They are thoroughly mixed by vigorous shaking until they are a homogeneous mixture. This provides a mixture of 33.3% liquid crystal to 66.6% prepolymer which already contains a ultraviolet photo initiator identified as Daocure 1173, supplied by EM Industries.

Mixture 2

3.3 grams of E-7, 6.5 grams of ethyl acrylate monomer and 0.2 grams of Daocure 1173 are weighed into a brown bottle and capped. They are thoroughly mixed by vigorous shaking until they are a homogeneous mixture. This provides a mixture of 33% nematic liquid crystal to 65% monomer with 2% of the radical producing photo initiator.

Mixture 3

3.3 grams of E-7, 6.5 grams of t-butyl acrylate monomer and 0.2 grams of Daocure 1173 are weighed into a brown bottle and capped. They are thoroughly mixed by vigorous shaking until they are a homogeneous mixture. This provides a mixture of 33% nematic liquid crystal to 65% monomer with 2% of the radical producing photo initiator.

Mixture 4

3.3 grams of E-7, 6.5 grams of isobornyl acrylate monomer and 0.2 grams of Daocure 1173 are weighed into a brown bottle and capped. They are thoroughly mixed by vigorous shaking until they are a homogeneous mixture. This provides a mixture of 33% nematic liquid crystal to 65% monomer with 2% of the radical producing photo initiator.

EXAMPLE 1

A piece of conductive glass supplied by the Donnelly Corporation, Holland, Mich., which is 0.043" thick indium tin oxide coated glass with a chemically deposited $SiO_2$ layer under the indium tin oxide is cleansed by immersing the glass in a 10% KOH-isopropyl alcohol solution for 2 minutes followed by two deionized water washes, followed by a 2 minute soak in concentrated sulfuric acid, followed by three distilled water rinses and one 2-propanol rinse, and then dried in a hot air convection oven for 10 minutes. One piece of said glass is cut to 1"×2" and is laid with the conductive side up. A wood applicator stick is dipped into spacers which are purchased from Dana Enterprises International, Inc., San Jose, Calif. The spacers are designated SPS-n, where n is the size of the alumina particle spacer in microns. For example, SPS-36 are 36 micron diameter alumina particles. The spacer used in this example was SPS-12 and some spacers adhered to the surface of the stick. The applicator stick is then rolled along half of the 2" length of the glass part dispersing a small amount of the spacers to its surface. The end of the slide that has spacers on it is flooded with Mixture 1. The second conductive glass slide is placed on top of the slide that is flooded with the composite mixture and spacers with the conductive side down so that the two conducting surfaces are facing one another. The top slide is arranged so that it overlaps the first one by 1". The top slide is pressed down with enough pressure so that the excess materials is squeezed from the cell and the top glass piece rests on the spacers. The excess mixture is wiped from the cell with an appropriate lint-free towel.

The material is exposed to ultraviolet radiation is a PPG Radiation Polymer Co. UV Processor. (Now RPG Industries, Hayward, Canada.) The two sets of lamps in the machine are turned on so that 300 watts is the machine intensity. The belt speed is adjusted to 20 feet per minute. The sample is put on the aluminum sled, the sample is placed on the belt and run through the machine. The sample is taken out of the exit side and run through the machine two more times. The sample is hard after the first exposure to UV light in the machine and the subsequent processing is to ensure complete reaction. The sample is then turned over on its other side and run through the machine three more times.

When viewed with the naked eye, the material is clear with very slight blue haze and does not scatter visible light to any significant amount.

EXAMPLE 2

The procedure of Example 1 is repeated with the exception that Mixture 2 is used in place of Mixture 1.

When viewed with the naked eye, the material is clear with a very slight blue haze and does not scatter light any significant amount.

EXAMPLE 3

The cell is prepared in exactly the same manner as in Example 1 with the exception that Mixture 3 is used instead of Mixture 1.

When viewed with the naked eye, the material is clear with a very slight blue haze and does not scatter light to any significant amount.

EXAMPLE 4

The cell is prepared in exactly the same manner as in Example 1 but Mixture 4 is used instead of Mixture 1.

When viewed with the naked eye, the material is clear with a very slight blue haze and does not scatter light to any significant amount.

Examples 5–8 are directed to the preparation of materials outside the scope of this invention. The curing rate in these examples is too slow and the resulting composites have droplet sizes above the range required.

EXAMPLE 5

The procedure of Example 1 is repeated with the exception that polymerization is carried by exposing it to a ultraviolet source manufactured by UVP Inc., San Gabriel, Calif. (Model XX-15 Blak-Ray) which is a 30 watt ultraviolet source centered at 365nm which is placed 24" away from the sample. The cell is exposed on one side for 2 hours, flipped onto the other side and exposed to the UV light for another 2 hours.

When viewed with the naked eye, the material is white and opaque. It scatters light to a great amount and one cannot see through it.

EXAMPLE 6

The cell is prepared in exactly the same manner as in Example 5 but Mixture 2 is used in place of Mixture 1.

When viewed with the naked eye, the material is much more cloudy or hazy than Example 1 and does not scatter as much light as Example 2.

EXAMPLE 7

The cell is prepared in exactly the same manner as Example 5 but Mixture 3 is used instead of Mixture 1.

When viewed with the naked eye, the material is much more cloudy or hazy than Example 1 but does not scatter as much as Example 2.

EXAMPLE 8

The cell is prepared in exactly the same manner as Example 5 but Mixture 4 is used instead of Mixture 1.

When viewed with the naked eye, the material is much more cloudy or hazy than Example 1 but does not scatter as much as Example 2.

In the examples that follow, the following mixtures were used.

Mixture 5

3.3 grams of E-7, 6.3 grams of ethyl acrylate monomer, 0.2 grams of trimethanol propane triacrylate and 0.2 grams of Daocure 1173 are weighed into a brown bottle and capped. They are thoroughly mixed by vigorous shaking until they are a homogeneous mixture. This provides a mixture of 33% nematic liquid crystal to 65% crosslinkable monomer solution with 2% of the radical producing photo initiator. As can be seen, Mixture 5 contains a trifunctional acrylate as a crosslinking agent.

Mixture 6

3.3 grams of E-7, 6.3 grams of t-butyl acrylate monomer, 0.2 grams of trimethanol propane triacrylate and 0.2 grams of Daocure 1173 are weighed into a brown bottle and capped. They are thoroughly mixed by vigorous shaking until they are a homogeneous mixture. This provides a mixture with 33% nematic liquid crystal to 65% crosslinkable monomer solution with 2% of the radical producing photo initiator.

Mixture 7

3.3 grams of E-7, 6.3 grams of isobornyl acrylate monomer, 0.2 grams of trimethanol propane triacrylate and 0.2 grams of Daocure 1173 are weighed into a brown bottle and capped. They are thoroughly mixed by vigorous shaking until they are a homogeneous mixture. This provides a mixture of 33% nematic liquid crystal to 65% crosslinkable monomer solution with 2% of the radical producing photo initiator.

EXAMPLE 9

The cell is prepared in exactly the same manner as in Example 1 but Mixture 5 is used instead of Mixture 1.

When viewed with the naked eye, the material is clear with a very slight blue haze and does not scatter light to any significant amount.

EXAMPLE 10

The cell is prepared in exactly the same manner as in Example 1 but Mixture 6 is used instead of Mixture 1.

When viewed with the naked eye, the material is clear with a very slight blue haze and does not scatter light to any significant amount.

EXAMPLE 11

The cell is prepared in exactly the same manner as in Example 1 but Mixture 7 is used instead of Mixture 1.

When viewed with the naked eye, the material is clear with a very slight blue haze and does not scatter light to any significant amount.

The material produced by Example 1 was subjected to transmission electron microscopy (TEM) by utilizing ultra-thin cross sections approximately 70 nm thick prepared using a LKB ultra microtome with a diamond knife. The thin sections were post stained with $OsO_4$ vapor for contrast enhancement. The thin specimens were then carbon coated and examined in a JEOL 100-CX transmission electron microscope operating at 80 KV. To determine particle size distribution, automated image analysis was performed on the TEM micrographs using a Quantimet-970 image analyzer. It is to be noted that the particle sizes are not uniform across the film thickness, with the particles in the bulk or core generally being smaller than the particles near the surface. However, as will be seen, there is substantially no particle or droplet having a size greater than 0.1 micron. The results of the transmision electron microscopy are summarized in the following table.

TABLE 1

| Region | Mean | Std. Dev. | *C.V. |
| --- | --- | --- | --- |
| Bulk (core) | 0.042 m | 0.015 m | 36% |
| Surface II | 0.073 m | 0.025 m | 34% |

*C.V.: coefficient of variance = Std. Dev./Mean

It is to be noted that the table clearly shows the very small droplet size of the novel materials of this invention and the figures listed in the above table are the result of around 200 measurements. Tables 2 and 3 represent histograms of the core and the surface upon which Table 1 is based.

The material produced by the process of Example 1 was tested for its Kerr constant by applying a voltage across the cell. The Kerr constant measured is about 4,000 times the Kerr constant of liquid $CS_2$ (about $1 \times 10^{-3}$ esu). The material of Example 1 when subjected to an electric field of about 5 volts per micron causes a change in refractive index on the 3[order of about $2 \times 10^{-3}$.

The response decay time is less than 50 microseconds after the pulsed electric field is turned off. When an electric field is applied, second harmonic generation is seen. With a field of 10 v/micron, the effective $X^{(2)}$ of this material is about $10^{-10}$ esu.

TABLE 2

Cambridge Instruments QUANTIMET 970 QUIPS/MX: VO5.00A
DISTRIBUTION OF FEATURE COUNT vs CALC
Total FEATURE COUNT = 248. Mean = 0.0423 Std Dev = 0.0152
Undersize Count = 0. Oversize Count = 0.

| CALC (MICRONS) LIMITS | COUNT | |
| --- | --- | --- |
| 0.–0.0050 | 0. | : |
| 0.0050–0.010 | 1. | : |
| 0.010–0.015 | 1. | : |
| 0.015–0.020 | 5. | :***** |
| 0.020–0.025 | 15. | :*************** |
| 0.025–0.030 | 32. | :******************************** |
| 0.030–0.035 | 38. | :厄厄厄厄厄厄厄厄厄厄厄厄厄厄厄厄厄厄厄厄厄厄厄厄厄厄厄厄厄厄厄厄厄厄厄厄厄厄 |
| 0.035–0.040 | 33. | :********************************* |
| 0.040–0.045 | 32. | :******************************** |
| 0.045–0.050 | 21. | :********************* |
| 0.050–0.055 | 22. | :********************** |
| 0.055–0.060 | 17. | :***************** |
| 0.060–0.065 | 8. | :******** |
| 0.065–0.070 | 7. | :******* |
| 0.070–0.075 | 6. | :****** |
| 0.075–0.080 | 4. | :*** |
| 0.080–0.085 | 5. | :***** |
| 0.085–0.090 | 1. | : |
| 0.090–0.095 | 0. | : |
| 0.095–0.10 | 0. | : |

TABLE 3

Cambridge Instruments QUANTIMET 970 QUIPS/MX: VO5.00A
DISTRIBUTION OF FEATURE COUNT vs CALC
Total FEATURE COUNT = 273. Mean = 0.0729 Std Dev = 0.0251
Undersize Count = 0. Oversize Count = 3.

| CALC (MICRONS) LIMITS | COUNT | |
| --- | --- | --- |
| 0.–0.0050 | 1. | :* |

TABLE 3-continued

Cambridge Instruments QUANTIMET 970 QUIPS/MX: VO5.00A
DISTRIBUTION OF FEATURE COUNT vs CALC
Total FEATURE COUNT = 273. Mean = 0.0729 Std Dev = 0.0251
Undersize Count = 0. Oversize Count = 3.

| CALC (MICRONS) LIMITS | COUNT | |
|---|---|---|
| 0.0050–0.010 | 2. | :*** |
| 0.010–0.015 | 1. | :* |
| 0.015–0.020 | 0. | : |
| 0.020–0.025 | 0. | : |
| 0.025–0.030 | 2. | :*** |
| 0.030–0.035 | 6. | :********* |
| 0.035–0.040 | 6. | :********* |
| 0.040–0.045 | 9. | :************* |
| 0.045–0.050 | 20. | :******************************* |
| 0.050–0.055 | 25. | :******************************************* |
| 0.055–0.060 | 14. | :********************* |
| 0.060–0.065 | 20. | :******************************* |
| 0.065–0.070 | 23. | :*********************************** |
| 0.070–0.075 | 24. | :*********************************** |
| 0.075–0.080 | 21. | :********************************** |
| 0.080–0.085 | 24. | :*********************************** |
| 0.085–0.090 | 14. | :********************* |
| 0.090–0.095 | 15. | :********************** |
| 0.095–0.10 | 8. | :************ |
| 0.10–0.10 | 9. | :************* |
| 0.10–0.11 | 8. | :*********** |
| 0.11–0.11 | 5. | :******* |
| 0.11–0.12 | 4. | :****** |
| 0.12–0.12 | 1. | :* |
| 0.12–0.13 | 5. | :******* |
| 0.13–0.13 | 1. | :* |
| 0.13–0.14 | 2. | :*** |
| 0.14–0.14 | 2. | :*** |
| 0.14–0.15 | 1. | :* |

What is claimed is:

1. A material which is incapable of substantially scattering visible light comprising droplets of a liquid crystal dispersed in a light-transmissive polymer matrix, said liquid crystal being soluble in the matrix-forming composition and said droplets being spontaneously formed from solution in the composition during solidification thereof wherein at least 85% of said droplets have a diameter no greater than 0.1 micron.

2. The material of claim 1 wherein the liquid crystal is present in an amount of from 25–40 weight percent.

3. The material of claim 1 wherein the liquid crystal is present in an amount of from 30–35 weight percent.

4. The material of claim 2 wherein the droplet size ranges between 0.05±0.02 microns.

5. The material of claim 3 wherein the droplet size ranges between 0.05±0.02 microns.

6. The material of claim 1 wherein the polymer is a thermosetting resin.

7. The material of claim 2 wherein the polymer is a thermosetting resin.

8. The material of claim 6 wherein the polymer is an epoxy resin.

9. The material of claim 7 wherein the polymer is an epoxy resin.

10. The material of claim 8 wherein the liquid crystal material comprises a cyanobiphenyl.

11. The material of claim 9 wherein the liquid crystal material comprises a cyanobiphenyl.

12. The material of claim 1 wherein the polymer is a thermoplastic resin.

13. The material of claim 3 wherein the polymer is a thermoplastic resin.

14. The material of claim 12 wherein he polymer is an acrylate.

15. The material of claim 13 wherein the polymer is an acrylate.

16. The material of claim 14 wherein the liquid crystal material is a cyanobiphenyl.

17. The material of claim 15 wherein the liquid crystal material is a cyanobiphenyl.

* * * * *